US009144846B2

(12) United States Patent
Bernardi

(10) Patent No.: US 9,144,846 B2
(45) Date of Patent: Sep. 29, 2015

(54) WRENCH FOR ROTARY TOOL

(75) Inventor: Walter Bernardi, Highland Park, IL (US)

(73) Assignee: Robert Bosch GmbH, Stuttgart (DE)

( * ) Notice: Subject to any disclaimer, the term of this patent is extended or adjusted under 35 U.S.C. 154(b) by 916 days.

(21) Appl. No.: 13/228,066

(22) Filed: Sep. 8, 2011

(65) Prior Publication Data

US 2013/0062838 A1 Mar. 14, 2013

(51) Int. Cl.
| | | |
|---|---|---|
| *B23B 31/06* | (2006.01) | |
| *B23B 31/20* | (2006.01) | |
| *B23B 45/00* | (2006.01) | |
| *B25B 13/48* | (2006.01) | |
| *B25B 33/00* | (2006.01) | |

(52) U.S. Cl.
CPC ............ *B23B 31/201* (2013.01); *B23B 45/006* (2013.01); *B25B 13/48* (2013.01); *B25B 33/005* (2013.01); *B23B 31/06* (2013.01); *B23B 2231/2081* (2013.01); *B23B 2260/078* (2013.01); *B23B 2260/138* (2013.01); *Y10T 279/17299* (2015.01); *Y10T 279/3431* (2015.01); *Y10T 279/3451* (2015.01)

(58) Field of Classification Search
CPC .... B23B 31/06; B23B 31/201; B23B 45/006; B23B 2231/2081; B23B 2260/078; B23B 2260/138; B25B 13/48; B25B 33/005
USPC ............ 279/150, 42, 147, 48, 149, 52; 81/16, 81/489, 121.1, 119, 120; D8/303
See application file for complete search history.

(56) References Cited

U.S. PATENT DOCUMENTS

| | | | |
|---|---|---|---|
| 3,765,074 A * | 10/1973 | Payne | ............... 279/46.5 |
| 4,462,728 A | 7/1984 | Sturgis | |
| 4,811,637 A | 3/1989 | McCleary | |
| 5,197,749 A | 3/1993 | Moore et al. | |
| 5,655,242 A | 8/1997 | Chuang | |

(Continued)

FOREIGN PATENT DOCUMENTS

| | | |
|---|---|---|
| EP | 0765706 A1 | 4/1997 |
| EP | 1203641 A2 | 5/2002 |

(Continued)

OTHER PUBLICATIONS

Dremel, Flex-Shaft Attachment Instructions Model 225, Instruction Manual, 2 pages, available at least as early as Sep. 7, 2011.

(Continued)

*Primary Examiner* — Eric A Gates
*Assistant Examiner* — Chwen-Wei Su
(74) *Attorney, Agent, or Firm* — Maginot Moore & Beck LLP

(57) ABSTRACT

A rotary tool includes a housing, a tool holder, and a wrench assembly. The housing includes an end portion having external threads. The tool holder extends from the end portion and includes a fastening member configured for movement between an unclamped position and a clamped position in which the tool holder can engage a tool. The wrench assembly includes a body portion and a wrench member. The body portion includes (i) a plurality of internal threads configured to meshingly engage the external threads and (ii) an opening through which a portion of the tool holder extends when the internal threads are meshingly engaged to the external threads. The wrench member includes a wrench surface configured to engage the fastening member.

23 Claims, 7 Drawing Sheets

(56) References Cited

U.S. PATENT DOCUMENTS

| | | | |
|---|---|---|---|
| 5,819,594 A * | 10/1998 | Sjovall | 74/551.9 |
| 6,648,567 B2 | 11/2003 | Berry et al. | |
| 7,293,944 B2 | 11/2007 | Lui | |
| 7,344,141 B2 | 3/2008 | Schnell et al. | |
| 2005/0252347 A1 | 11/2005 | Austin et al. | |
| 2006/0018727 A1 | 1/2006 | Lui | |
| 2006/0110229 A1 | 5/2006 | Schnell et al. | |
| 2009/0200758 A1 * | 8/2009 | Lam et al. | 279/62 |

FOREIGN PATENT DOCUMENTS

| | | |
|---|---|---|
| GB | 1251419 A | 10/1971 |
| WO | 2009155660 A1 | 12/2009 |

OTHER PUBLICATIONS

International Search Report and Written Opinion in corresponding PCT Application (i.e., PCT/US2012/054217), completed Nov. 26, 2012 (13 pages).

\* cited by examiner

WRENCH FOR ROTARY TOOL

FIELD

This patent relates generally to rotary tools, and particularly to a wrench for use with a rotary tool.

BACKGROUND

Rotary tools are a favorite instrument of professional craftsmen, handymen, homeowners, and hobbyists. The typical rotary tool is a handheld power tool configured for use with a variety of accessory bits/tools that can be used for cutting, carving, sanding, polishing, and many other applications, referred to collectively as cutting operations. One specific example of a rotary tool is the DREMEL® rotary tool sold by the Robert Bosch Corporation.

Most rotary tools include a collet assembly coupled to the drive shaft of an electric motor. The collet assembly is configurable to couple or to decouple an accessory bit to the drive shaft of the electric motor. The electric motor is operable to rotate the collet assembly and any accessory bit coupled thereto. The accessory bit may be removed and replaced with a different accessory bit when the accessory bit becomes nonfunctional or when the user desires to perform a different cutting operation.

Typically, a collet tool is provided to loosen or tighten the collet assembly. For example, the collet tool may be a wrench that is sized to receive a collet nut of the collet assembly. Frequently, the collet tool is small and easily misplaced. Additionally, the size and shape of some collet tools makes them uncomfortable for some users to grasp.

It would, therefore, be desirable to provide a collet tool that is less likely to be misplaced and that is comfortable for most users to grasp and manipulate.

SUMMARY

According to one embodiment of the disclosure, a rotary tool includes a housing, a tool holder, and a wrench assembly. The housing includes an end portion having external threads. The tool holder extends from the end portion and includes a fastening member configured for movement between an unclamped position and a clamped position in which the tool holder can engage a tool. The wrench assembly includes a body portion and a wrench member. The body portion includes (i) internal threads configured to meshingly engage the external threads and (ii) an opening through which a portion of the tool holder extends when the internal threads are meshingly engaged to the external threads. The wrench member includes a wrench surface configured to engage the fastening member.

According to another embodiment of the disclosure, a wrench assembly for use with a rotary tool includes a housing having an end portion with external threads and a tool holder extending from the end portion. The tool holder includes a fastening member configured for movement between a clamped position and an unclamped position. The wrench assembly includes a body portion including internal threads configured to meshingly engage the external threads of the end portion of the rotary tool, and a wrench member including a wrench surface configured to engage the fastening member.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
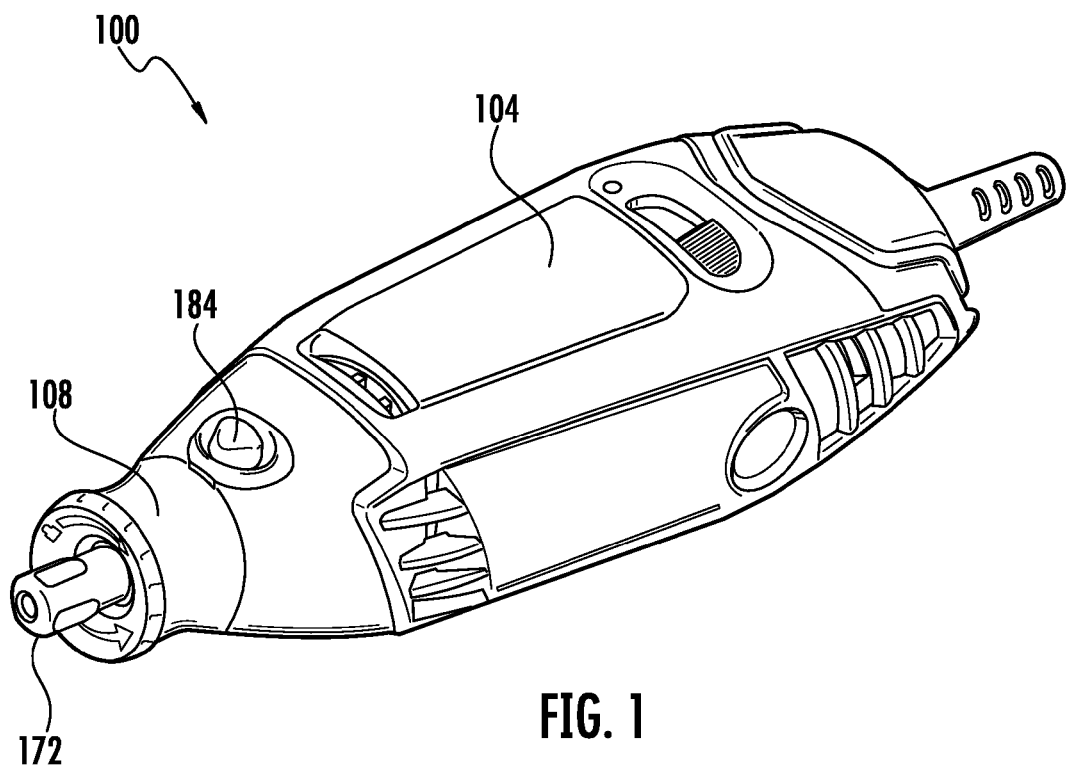
FIG. 1 is a perspective view of a rotary tool according to the disclosure, the rotary tool includes a wrench assembly shown in a housing engaged position.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIG. 1 shows a rotary tool 100, according to the disclosure, that includes a housing 104 and a wrench assembly 108 connected to the housing. The housing 104 is configured to be grasped by the hand of a user during operation of the rotary tool 100. The housing 104 may be formed from injection molded thermoplastic or from another suitable and durable material(s).

Figure 2:
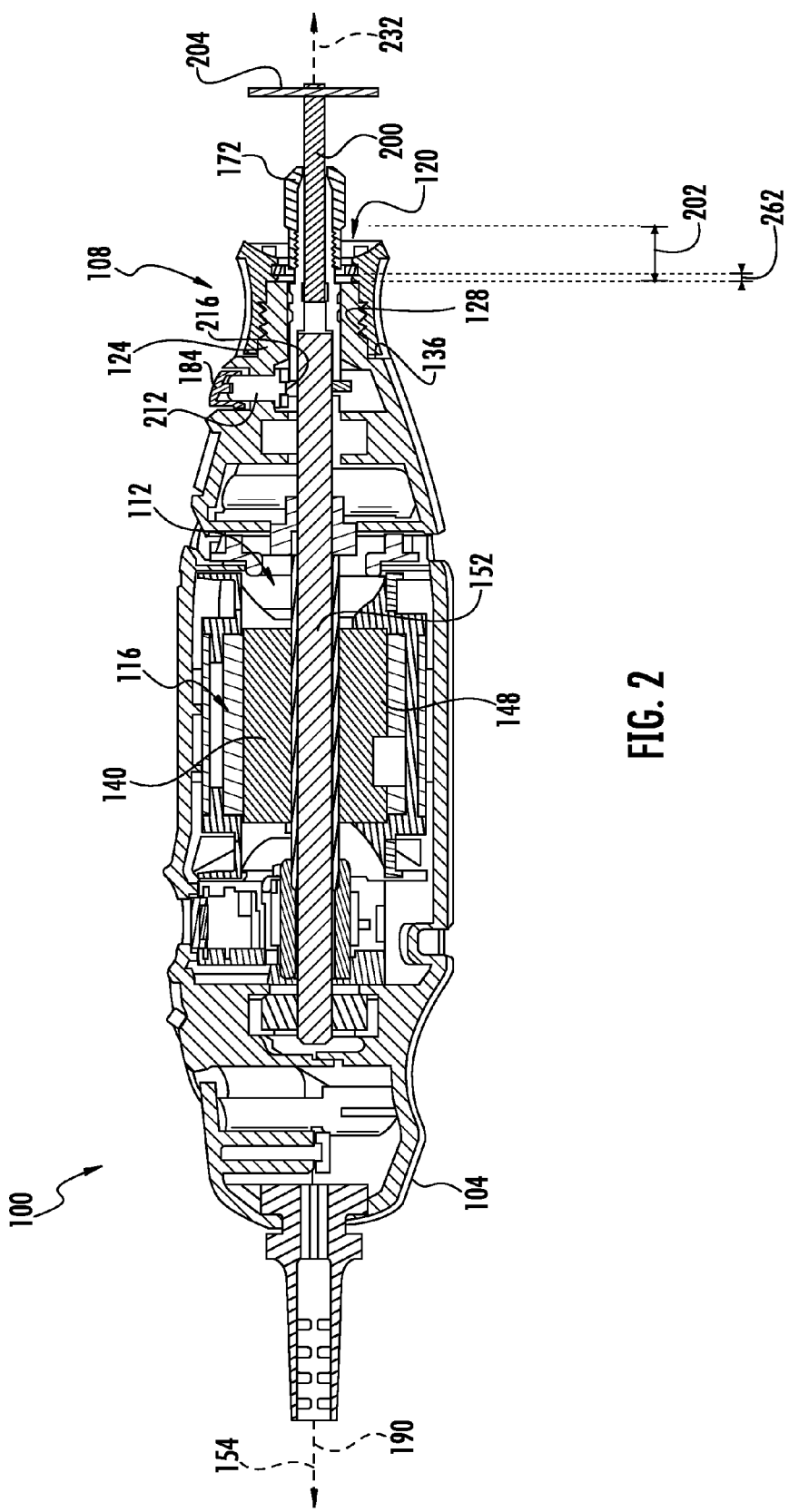
FIG. 2 is a cross sectional view of the rotary tool of FIG. 1.

As shown in FIG. 2, the housing 104 defines a cavity 112 in which a drive mechanism 116 and a tool holder 120 are at least partially positioned. An end portion 124 of the housing 104, near the tool holder 120, includes external threads 128 that are used to connect the wrench assembly 108 to the housing 104, as discussed herein. The end portion 124 also defines a shoulder 136 of the housing 104.

The drive mechanism 116 includes an electric motor 140 having a motor housing 148 and a drive shaft 152. The motor housing 148 is supported by the housing 104 and is configured to remain stationary relative to the housing 104 during operation of the electric motor 140. The drive shaft 152 extends from the motor housing 148 and is configured to rotate relative to the motor housing 148 during operation of the electric motor 140 about an axis of rotation 154. The electric motor 140 can be energized and activated in any known manner.

Figure 3:
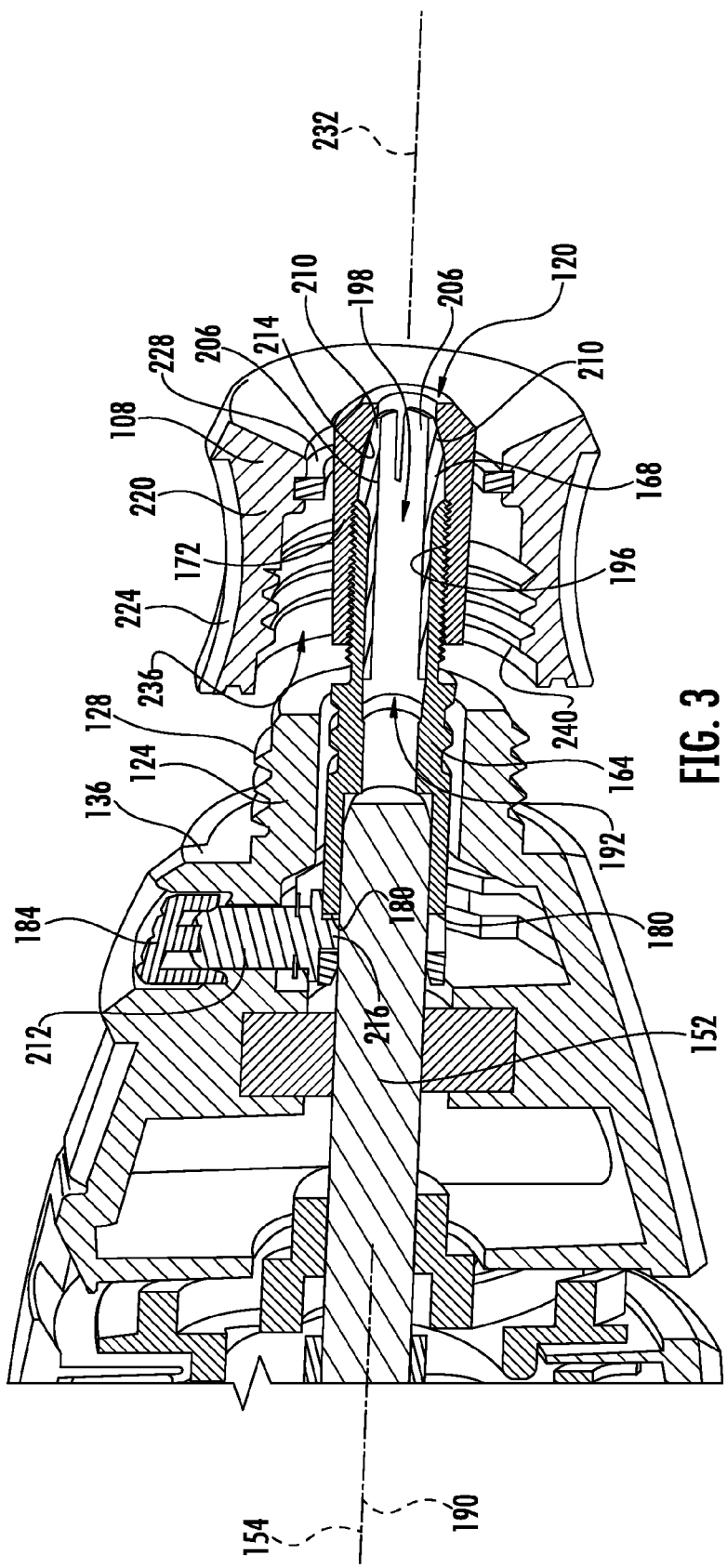
FIG. 3 is a cross sectional view of a portion of the rotary tool of FIG. 1, shown with the wrench assembly in a housing disengaged position.

With reference to FIG. 3, the tool holder 120 extends from the end portion 124 of the housing 104 and includes a connection member 164, a collet 168, and a fastening member 172. The connection member 164 is connected to the drive shaft 152 of the electric motor 140; accordingly, the connection member 164 is configured to rotate with the drive shaft 152. An axis of rotation 190 of the connection member is coaxial with the axis of rotation 154 of the drive shaft 152.

The connection member 164 defines a collet cavity 192 and includes two lock openings 180 and a plurality of external threads 196. The lock openings 180 are configured to engage a portion of a shaft lock assembly 184 of the rotary tool 100 to prevent rotation of the connection member 164. The collet cavity 192 is configured to receive at least a portion of the collet 168.

The collet 168 defines a generally cylindrical cavity 198 configured to receive a mandrel 200 of an accessory bit/tool 204 (see FIG. 2). As shown in FIG. 3, the collet 168 includes at least two collet arms 206, which each include a beveled surface 210. As is known, the collet arms 206 are tightened about or released from the mandrel 200 of the accessory bit 204 by rotation of the fastening member 172.

With reference again to FIG. 3, the fastening member 172 is meshingly engaged with the external threads 196 of the connection member 164 and is rotatably movable between an unclamped position (not shown) and a clamped position (FIG. 3). The fastening member 172 has a beveled surface 214 that is positioned to contact the beveled surfaces 210 of the collet arms 206. When the fastening member 172 is in the unclamped position, the collet 168 is positioned such that it is prevented from applying the clamping force to the mandrel 200, and the accessory bit 204 may be inserted or removed from the cavity 198 of the collet 168. When the fastening member 172 is in the clamped position, the beveled surface 214 contacts the beveled surfaces 210 and pushes the collet arms 206 radially inward, thereby causing the collet 168 to apply and maintain the clamping force on the mandrel 200 of the accessory bit 204. A portion of the fastening member 172 configured to be engaged by the wrench assembly 108 is spaced apart from the end portion 124 of the housing 104 by a distance 202 (FIG. 2).

Figure 4:
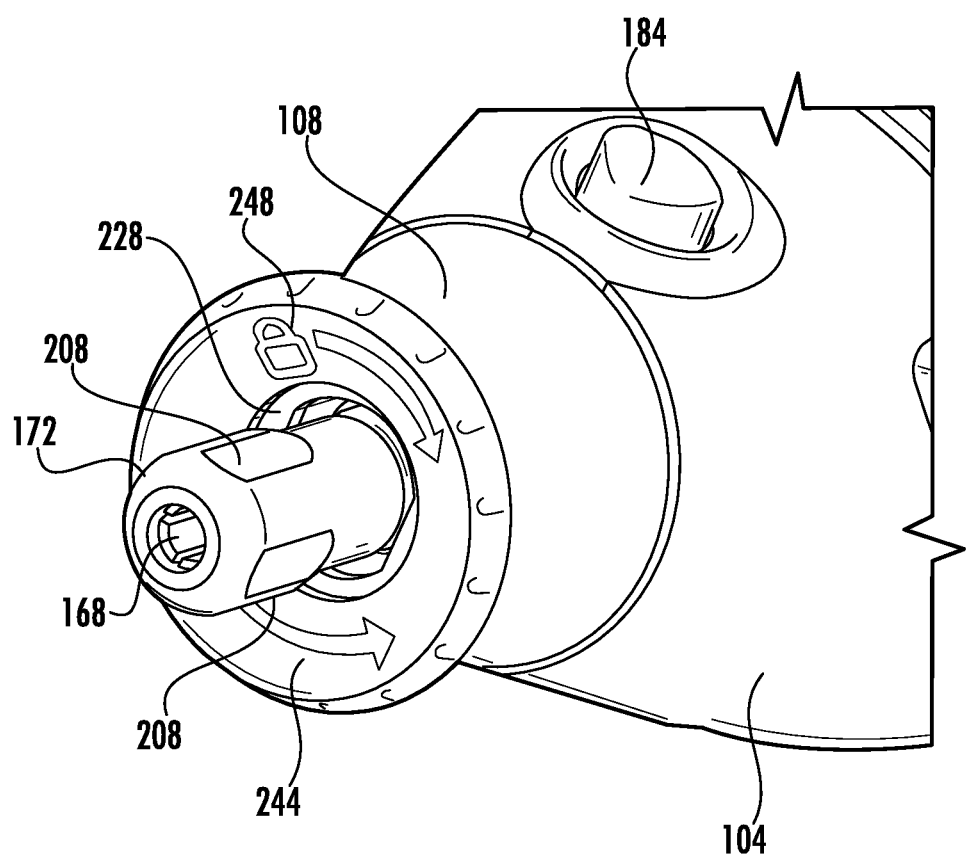
FIG. 4 is a cutaway perspective view of the rotary tool of FIG. 1, shown with the wrench assembly in the housing engaged position.
Figure 7:
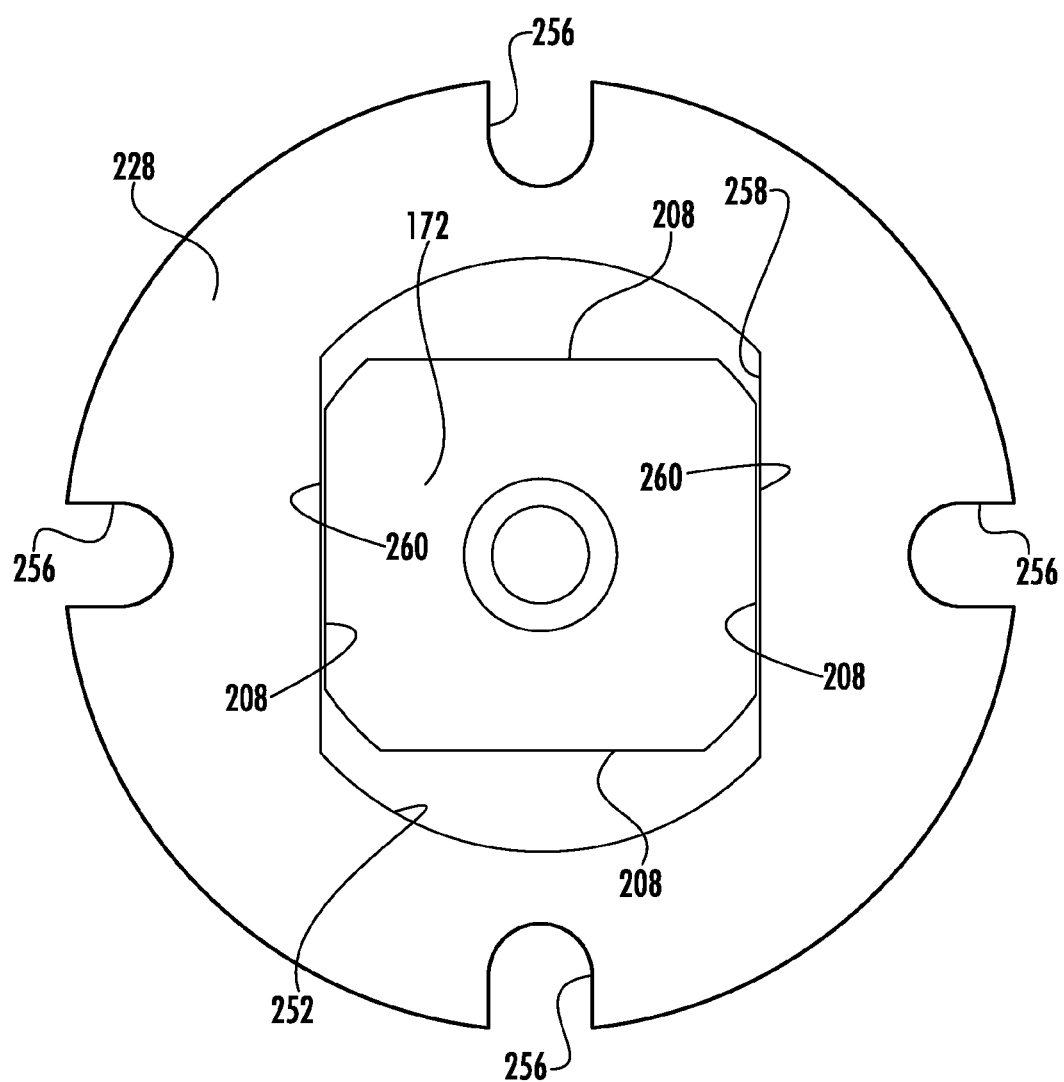
FIG. 7 is an elevational view of the wrench member and a fastening member of the rotary tool of FIG. 1.

As shown in FIGS. 4 and 7, the fastening member 172 includes four contact surfaces 208 (only two of which are shown in FIG. 4). The contact surfaces 208 are generally flat. Each contact surface 208 has an opposing contact surface, which is located on a diametrically opposite side of the fastening member 172. A contact surface 208 and its diametrically opposite contact surface may be referred to herein as a pair of contact surfaces. The contact surfaces 208 facilitate rotation of the fastening member 172 about the external threads 196 to advance or retract the fastening member along the connection member 164.

As described briefly above and shown in FIG. 3, the rotary tool 100 includes a shaft lock assembly 184, which includes a slide member 212 and a lock tab 216 extending from the slide member. The slide member 212 is slidably received by the housing 104 and is biased in a disengaged position (shown in FIG. 2) in which the connection member 164 is rotatable with respect to the housing 104. As shown in FIG. 3, the slide member 212 is movable to an engaged position in which the lock tab 216 is received by one of the lock openings 180 in the connection member 164. When the slide member 212 is in the engaged position, the rotational position of the connection member 164 is fixed with respect to the housing 104.

As shown in FIG. 3, the wrench assembly 108 includes a body portion 220, a grip portion 224, and a wrench member 228. When the wrench assembly 108 is connected to the housing 104 (as shown in FIG. 2), the longitudinal axis 232 is coaxial with the axis of rotation 190 of the tool holder and the axis of rotation 154 of the drive shaft 152.

The body portion 220 is a generally cylindrical member, which defines a longitudinal axis 232 and a central cavity 236 lined with a plurality of internal threads 240. The internal threads 240 are configured for meshing engagement with the external threads 128 formed on the end portion 124 of the housing 104 so that the wrench assembly 108 may be mounted on the housing for storage. The body portion 220 may be formed from injection molded thermoplastic or from other suitable and durable materials including, but not limited to, metal such as iron, steel, aluminum, and alloys thereof.

Figure 5:
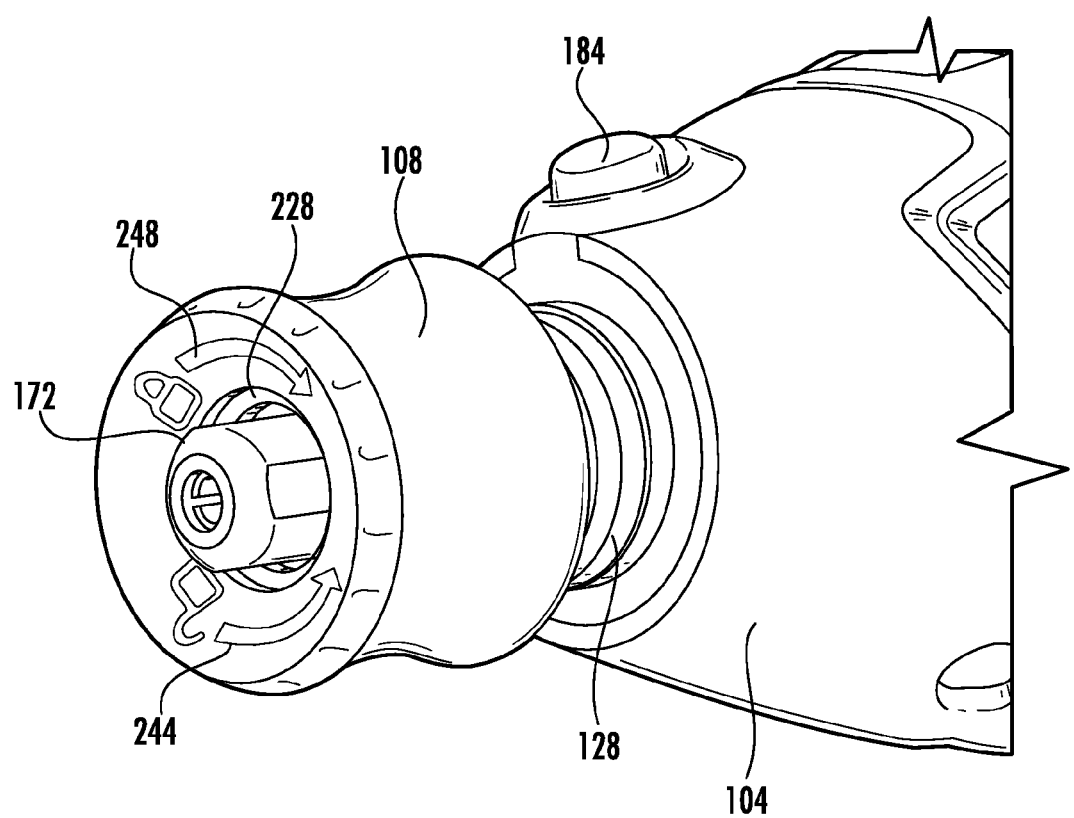
FIG. 5 is a cutaway perspective view of the rotary tool of FIG. 1, shown with the wrench assembly in the housing disengaged position.

As shown in FIGS. 4 and 5, the body portion 220 may be provided with an unlock indicium 244 and a lock indicium 248. The unlock indicium 244 includes an arrow pointing in the direction of rotation used to unthread the internal threads 240 from the external threads 128 and to move the fastening member 172 to the unclamped position. The lock indicium 248 includes an arrow pointing in the opposite direction for threading the internal threads 240 onto the external threads 128 and to move the fastening member 172 to the clamped position.

The grip portion 224 is positioned on the exterior of the body portion 220 and is configured to be grasped by a user to rotate the wrench assembly 108 relative to the housing 104. The grip portion 224 may be at least partially formed from an elastomeric material, such that the grip portion is resilient and provides a comfortable surface for a user to grasp.

Figure 6:
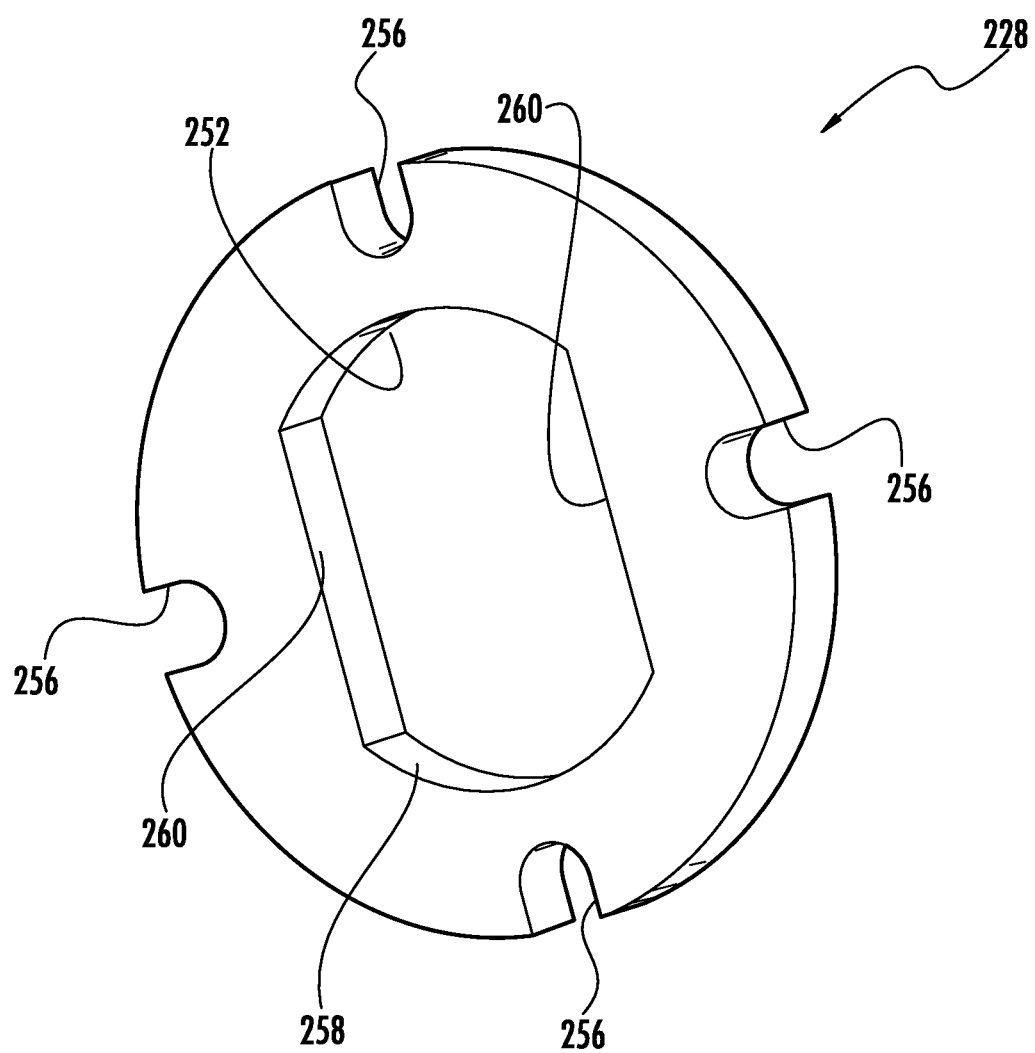
FIG. 6 is a perspective view of a wrench member of the rotary tool of FIG. 1.

As shown in FIG. 3, the wrench member 228 of the wrench assembly 108 is fixed within the body portion 220 so that it rotates with the body portion. With reference now to FIGS. 6 and 7, the wrench member 228 includes a fastening member opening 252. The shape of the opening 252 is at least partially complementary to the exterior of the fastening member 172 and, more specifically, the shape of the opening 252 is at least partially complementary to the contact surfaces 208. Additionally, the opening 252 is sized to enable the fastening member 172 to pass through the opening 252 when oriented in a particular rotational position (as shown in FIG. 7). The opening 252 is defined by a wrench surface 258, which is configured to engage the fastening member 172, thereby preventing rotation of the fastening member relative to the wrench assembly 108.

As shown in FIG. 7, the wrench surface 258 includes a first flat 260 and a second flat 260. A distance between the flats 260 is approximately equal to a distance between a pair of the contact surfaces 208 of the fastening member 172. When the wrench surface 258 engages the fastening member 172, each flat 260 is positioned against one of the contact surfaces 208, and rotation of the wrench member 228 results in rotation of the fastening member relative to the connection member 164 (when the shaft lock assembly 184 is in the engaged position). It is noted that, alternatively, the wrench surface 258 may have any shape as determined by the exterior shape of the fastening member 172.

The wrench member 228 may be stamped from a blank of steel with a die. Accordingly, the wrench member 228 is resistant to wear and is configured to maintain its shape in response to forces exerted on the wrench surface 258. Alternatively, the wrench member 228 may be formed from any other suitably made material and any other suitable process including, but not limited to, injection molded thermoplastic.

The wrench member 228 may include notches 256 in the form of indentations defined on the generally circular periphery of the wrench member. The notches 256 are configured to be at least partially filled with the material of the body portion 224. In one embodiment, the body portion 220 may be formed or over-molded around the wrench member 228 so that the material of the body portion infiltrates the notches 256. When the material of the body portion 220 hardens, the portion of the body portion within the notches 256 prevents the wrench member 228 from moving relative to the body portion. Alternatively, the body portion 220 may be configured to receive the wrench member 228 in a snap-fit arrangement in which the body portion includes tangs (not shown) configured to engage the notches 256 and to prevent relative rotation between the two components.

The wrench assembly 108 is movable to and between a housing disengaged position (FIGS. 3 and 5) and a housing engaged position (FIGS. 1, 2, and 4). In the housing disengaged position, the internal threads 240 are separated from the external threads 128 and the wrench surface 258 is positionable to engage the fastening member 172. When the wrench assembly 108 is positioned in the housing engaged position, the internal threads 128 are meshingly engaged with the external threads 240 and the body portion 220 is seated against the shoulder 136. In the housing engaged positioned, the wrench member 228 is positioned apart from from the contact surfaces 208 of the fastening member 172 and is positioned a distance 262 from the end portion 124 of the housing 104, such that the wrench surface 258 is disengaged from the fastening member 172 so as not to interfere with rotation of the fastening member when the tool is in use. The distance 202 is greater than the distance 262.

In operation, the wrench assembly 108 may remain connected to the housing 104 during operation and storage of the rotary tool 100. Accordingly, the wrench assembly 108 is less likely than other types of collet tools to be misplaced by a user.

The wrench assembly 108 may be used to move the fastening member 172 between the engaged position and the disengaged positions to allow removal of the accessory bit 200. Starting from the configuration of the rotary tool 100, as shown in FIG. 2, the fastening member 172 may be moved to the disengaged position according to the following procedure. First, the wrench assembly 108 is rotated in the unlock direction by hand and without the assistance of any other tools until the wrench assembly is separated from the end portion 124 of the housing 104. Next, the wrench member 228 of the wrench assembly 108 is positioned to engage the fastening member 172, as shown in FIGS. 3 and 5. In particular, the wrench member 228 is manipulated until the flats 260 of the wrench member are aligned with the contact surfaces 208. Then, the wrench member 228 may be moved away from the housing 104 until the wrench member is positioned approximately in the middle of the fastening member 172 to facilitate rotating the wrench member. Once the wrench member 228 is engaged with the fastening member 172, the shaft lock assembly 184 is moved to the engaged position, thereby permitting the fastening member 172 to be rotated relative to the connection member 164.

Next, the wrench assembly 108 is rotated by hand and without the assistance of any other tools in the direction indicated by the unlock indicia 244. Since the wrench member 228 is engaged with the fastening member 172, the fastening member also rotates relative to the connection member 164. The rotation of the fastening member 172 releases the collet 168, which releases the clamping force so that the mandrel 200 of the accessory bit 204 may be removed from the tool holder 120. During this disengagement process, it is not necessary to fully separate the wrench assembly 108 from the rotary tool 100. In other words, as shown in FIG. 3, the wrench member 228 is always within the envelope of the rotary tool 100 so that it is not easily lost.

The wrench assembly 108 may also be used to move the fastening member 172 to the engaged position to lock the collet 168 onto the accessory bit 204. An engagement process may be performed, finishing with rotating the wrench member 108 in the direction identified by the lock indicium 248, to lock the collet 168 onto the mandrel 200. Once the fastening member 172 is fully tightened, the wrench assembly 108 can be moved along the fastening member 172 toward the housing 104. The wrench assembly 108 is then rotated to engage the internal threads 240 of the body portion 220 with the external threads 128 of the end portion 124 until the body portion is seated against the shoulder 136. The wrench assembly 108 is seated on the shoulder 136 in a hand-tight configuration so that it may later be removed by hand without the assistance of any other tools.

It can be appreciated that when certain types of accessory bits/tools 204 are connected to the tool holder 120, the wrench assembly 108 cannot be completely separated from the housing 104. For instance, as shown in FIG. 2, the working portion of the accessory bit 204 is larger than a diameter of the opening 252 of the wrench assembly 108, thereby preventing removal of the wrench assembly, at least until the bit is removed. This further serves to prevent the wrench assembly 108 from being lost or misplaced.

In can also be appreciated that the term rotary tool 100 may encompass any type of tool configured to reciprocate, oscillate, or otherwise move an accessory bit. Similarly, although the drive mechanism 116, as described herein, includes an electric motor 140, in an alternative embodiment the drive mechanism could be manually driven.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A rotary tool comprising:
   a housing including an end portion having external threads;
   a drive shaft at least partially located within said housing and configured for rotation relative to said housing;
   a tool holder extending from said drive shaft, said tool holder including a fastening member configured for movement between an unclamped position and a clamped position in which the tool holder can engage a tool, said fastening member defining a contact surface; and
   a wrench assembly including a body portion and a wrench member,
   said body portion including (i) internal threads configured to meshingly engage said external threads and (ii) an opening through which a portion of said tool holder extends when said internal threads are meshingly engaged to said external threads, and
   said wrench member including a wrench surface configured to engage said contact surface, said wrench surface and said contact surface configured as rotationally interlocking surfaces.

2. The rotary tool of claim 1, wherein said wrench surface is positionable to engage said contact surface only when said internal threads are disengaged from said external threads.

3. The rotary tool of claim 1, wherein said wrench assembly includes an elastomeric grip portion positioned on an exterior surface of said body portion.

4. The rotary tool of claim 1, wherein:
   said body portion includes a first indicium configured to indicate a first direction of rotation to move said fastening member to said clamped position, and
   said body portion includes a second indicium configured to indicate a second direction of rotation to move said fastening member to said unclamped position.

5. The rotary tool of claim 1, wherein:
   said wrench assembly defines a longitudinal axis,
   said tool holder defines an axis of rotation, and said longitudinal axis is coaxial with said axis of rotation when said internal threads are meshingly engaged with said external threads.

6. The rotary tool of claim 1, wherein:
said tool holder is configured for rotation relative to said housing, and
rotation of said wrench assembly causes rotation of at least a portion of said tool holder when said wrench member is engaged with said contact surface.

7. The rotary tool of claim 1, wherein
said wrench surface is complementary to said contact surface.

8. A wrench assembly for use with a rotary tool including a housing having an end portion with external threads and a tool holder extending from said end portion and having a fastening member configured for movement between a clamped position and an unclamped position, the fastening member defining a contact surface, the wrench assembly comprising:
a body portion including internal threads configured to meshingly engage the external threads of the end portion of the rotary tool; and
a wrench member including a wrench surface configured to engage the contact surface, said wrench surface and the contact surface configured as rotationally interlocking surfaces,
wherein said body portion is configured so that said wrench surface is disengaged from the contact surface when said internal threads are meshingly engaged with the external threads.

9. The wrench assembly of claim 8, wherein:
said body portion includes a first indicium configured to indicate a first direction of rotation to move said fastening member to said clamped position, and
said body portion includes a second indicium configured to indicate a second direction of rotation to move said fastening member to said unclamped position.

10. The wrench assembly of claim 8, wherein:
said body portion includes an elastomeric grip portion positioned on an exterior surface of said body portion, and
said elastomeric grip portion is at least partially formed from an elastomeric material.

11. The wrench assembly of claim 8, wherein:
said body portion defines a longitudinal axis,
the tool holder defines an axis of rotation, and
said longitudinal axis is coaxial with said axis of rotation when said internal threads are meshingly engaged with the external threads.

12. The wrench assembly of claim 8, wherein:
the tool holder is configured for rotation relative to the housing, and
said body portion is configured so that rotation of said body portion causes rotation of at least a portion of the tool holder when said wrench surface is engaged with the contact surface.

13. The wrench assembly of claim 8, wherein said wrench member defines a fastening member opening having a shape complementary to a shape of the fastening member.

14. The wrench assembly of claim 8, wherein said body portion is configured so that said wrench surface is positionable to engage the contact surface only when said internal threads are disengaged from the external threads.

15. The wrench assembly of claim 8, wherein:
said body portion is at least partially formed from injection molded thermoplastic, and said wrench member is formed from metal.

16. The wrench assembly of claim 8, wherein said wrench member includes a plurality of notches configured to receive a portion of the body portion.

17. The wrench assembly of claim 16, wherein said notches are located on a periphery of said wrench member.

18. The wrench assembly of claim 8, wherein said wrench member is configured so that said body portion is removable from the housing only when said wrench member is positioned to engage the contact surface.

19. A rotary tool comprising:
a housing including an end portion having external threads;
a tool holder extending from said end portion, said tool holder including a fastening member configured for movement between an unclamped position and a clamped position in which the tool holder can engage a tool; and
a wrench assembly including a body portion and a wrench member,
said body portion including (i) internal threads configured to meshingly engage said external threads and (ii) an opening through which a portion of said tool holder extends when said internal threads are meshingly engaged to said external threads, and
said wrench member including a wrench surface configured to engage said fastening member,
wherein said wrench surface is positionable to engage said fastening member only when said internal threads are disengaged from said external threads.

20. The rotary tool of claim 19, wherein:
said fastening member is spaced apart from said end portion by a first distance,
said wrench member is located between said end portion and said fastening member and is spaced apart from said end portion by a second distance when said internal threads are meshingly engaged with said external threads, and
said first distance is greater than said second distance.

21. A rotary tool comprising:
a housing including an end portion having external threads;
a tool holder extending from said end portion, said tool holder including a fastening member configured for movement between an unclamped position and a clamped position in which the tool holder can engage a tool, said fastening member defining a contact surface; and
a wrench assembly including a body portion and a wrench member,
said body portion including (i) internal threads configured to meshingly engage said external threads and (ii) an opening through which a portion of said tool holder extends when said internal threads are meshingly engaged to said external threads, and
said wrench member including a wrench surface configured to engage said contact surface,
wherein said contact surface and said wrench surface are configured as complementary interlocking surfaces.

22. The rotary tool of claim 21, wherein said wrench surface is positionable to engage said contact surface only when said internal threads are disengaged from said external threads.

23. The rotary tool of claim 21, wherein said wrench member is configured so that said body portion is removable from said housing only when said wrench surface is positioned to engage said contact surface.

* * * * *